(12) United States Patent
Watanabe

(10) Patent No.: US 11,650,565 B2
(45) Date of Patent: May 16, 2023

(54) MACHINE LEARNING DEVICE AND THERMAL DISPLACEMENT COMPENSATION DEVICE

(71) Applicant: FANUC CORPORATION, Yamanashi (JP)

(72) Inventor: Mitsunori Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1431 days.

(21) Appl. No.: 15/923,534

(22) Filed: Mar. 16, 2018

(65) Prior Publication Data

US 2018/0275629 A1    Sep. 27, 2018

(30) Foreign Application Priority Data

Mar. 21, 2017    (JP) .............................. JP2017-054266

(51) Int. Cl.
*G05B 19/404*    (2006.01)
*G01K 3/00*    (2006.01)
(Continued)

(52) U.S. Cl.
CPC ............. *G05B 19/404* (2013.01); *G01K 3/00* (2013.01); *G01K 13/00* (2013.01); *G01N 25/16* (2013.01);
(Continued)

(58) Field of Classification Search
None
See application file for complete search history.

(56) References Cited

U.S. PATENT DOCUMENTS 5,561,741 A    10/1996    Wasserman
6,471,451 B2 *    10/2002    Kojima ................. G05B 19/404
                                                      318/471
(Continued)

FOREIGN PATENT DOCUMENTS

CN    103926874    7/2014
CN    104972360    10/2015
(Continued)

OTHER PUBLICATIONS

Notification of Reasons for Refusal dated Jan. 8, 2019 in corresponding Japanese Patent Application No. 2017-054266.
(Continued)

*Primary Examiner* — Jason Lin
(74) *Attorney, Agent, or Firm* — Wenderoth, Lind & Ponack, L.L.P.

(57) ABSTRACT

A machine learning device includes: a measured data acquisition unit that acquires a measured data group; a thermal displacement acquisition unit that acquires a thermal displacement actual measured value about a machine element; a storage unit that uses the measured data group acquired by the measured data acquisition unit as input data, uses the thermal displacement actual measured value about the machine element acquired by the thermal displacement acquisition unit as a label, and stores the input data and the label in association with each other as teaching data; and a calculation formula learning unit that performs machine learning based on the measured data group and the thermal displacement actual measured value about the machine element, thereby setting a thermal displacement estimation calculation formula used for calculating the thermal displacement of the machine element based on the measured data group.

11 Claims, 11 Drawing Sheets

(51) Int. Cl.
  *G01K 13/00* (2021.01)
  *G01N 25/16* (2006.01)
(52) U.S. Cl.
  CPC .............. *G05B 2219/32335* (2013.01); *G05B 2219/33034* (2013.01); *G05B 2219/49219* (2013.01)

(56) References Cited

U.S. PATENT DOCUMENTS

| | | | | |
|---|---|---|---|---|
| 6,671,573 | B2* | 12/2003 | Nigazawa | G05B 19/414 |
| | | | | 700/193 |
| 7,245,983 | B2* | 7/2007 | Suzuki | G05B 19/404 |
| | | | | 700/177 |
| 8,924,003 | B2* | 12/2014 | Maekawa | G05B 19/404 |
| | | | | 700/193 |
| 9,092,025 | B2* | 7/2015 | Maekawa | B23Q 11/0007 |
| 9,266,209 | B2* | 2/2016 | Murahashi | B23Q 11/0007 |
| 9,869,992 | B2* | 1/2018 | Takeno | G05B 19/404 |
| 10,401,829 | B2* | 9/2019 | Maekawa | G05B 19/4155 |
| 2002/0004688 | A1 | 1/2002 | Kojima et al. | |
| 2002/0038189 | A1* | 3/2002 | Mizuguchi | B23Q 15/18 |
| | | | | 702/94 |
| 2008/0215178 | A1 | 9/2008 | Senda | |
| 2013/0325164 | A1* | 12/2013 | Wwatanabe | B23H 7/18 |
| | | | | 700/186 |
| 2015/0276633 | A1* | 10/2015 | Koyama | G05B 19/404 |
| | | | | 702/94 |
| 2016/0076970 | A1* | 3/2016 | Takahashi | G06N 20/00 |
| | | | | 702/33 |

FOREIGN PATENT DOCUMENTS

| | | | | |
|---|---|---|---|---|
| CN | 106488828 | | 3/2017 | |
| DE | 102008005676 | A1 * | 8/2008 | ......... B23Q 11/0007 |
| JP | 06-008107 | | 1/1994 | |
| JP | 7-75937 | | 3/1995 | |
| JP | 08-141883 | | 6/1996 | |
| JP | 8-300242 | | 11/1996 | |
| JP | 11-114776 | | 4/1999 | |
| JP | 2003-094291 | | 4/2003 | |
| JP | 2004-154907 | | 6/2004 | |
| JP | 2005-186216 | | 7/2005 | |
| JP | 2010-120150 | | 6/2010 | |
| JP | 4488564 | | 6/2010 | |
| JP | 6001211 | | 10/2016 | |
| JP | 2017-045406 | | 3/2017 | |

OTHER PUBLICATIONS

Office Action dated May 5, 2019 in Chinese Patent Application No. 201810215390.2.

* cited by examiner

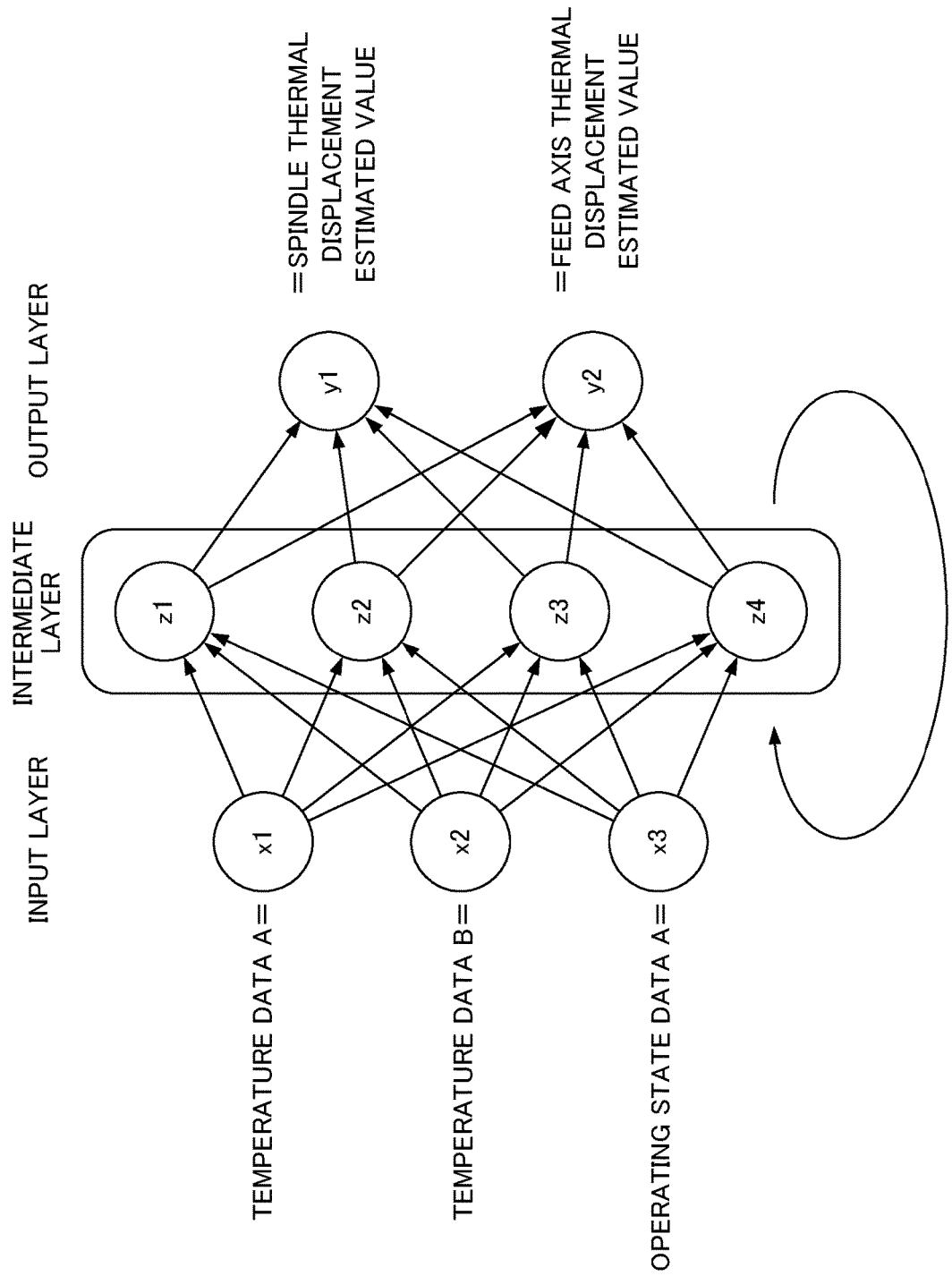

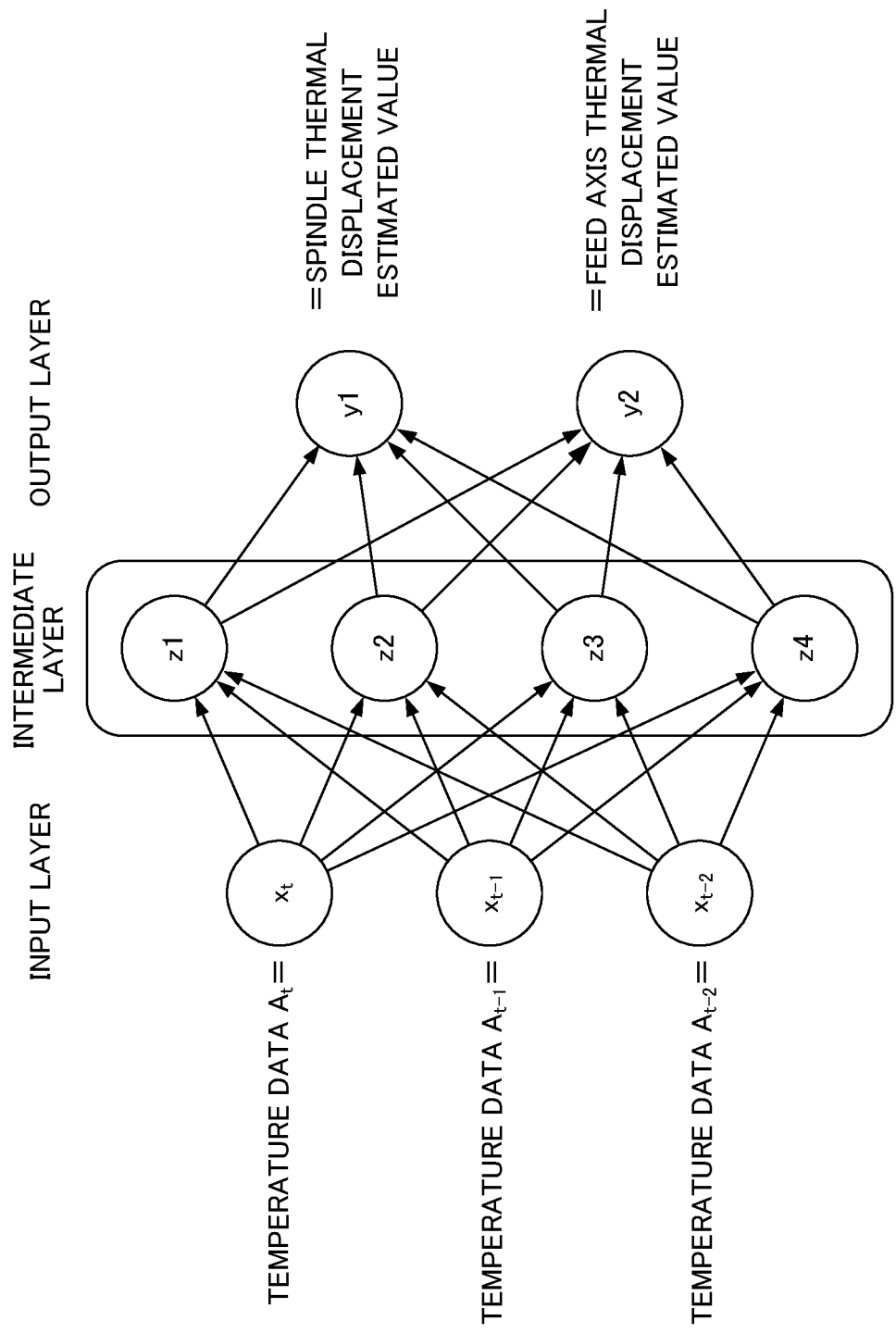

MACHINE LEARNING DEVICE AND THERMAL DISPLACEMENT COMPENSATION DEVICE

This application is based on and claims the benefit of priority from Japanese Patent Application No. 2017-054266, filed on 21 Mar. 2017, the content of which is incorporated herein by reference.

BACKGROUND OF THE INVENTION

Field of the Invention

The present invention relates to a machine learning device and a thermal displacement compensation device used for a machine tool.

Related Art

One of the main factors of a machining error in a machine tool has been relative thermal displacement caused between a tool and a workpiece by thermal expansion of a machine element in the machine tool. Specific examples of a component in the machine tool include a spindle, a spindle unit, a bed, a column, a work table, and a tool. These components, especially the spindle, are thermally deformed by generation of heat by rotation of the spindle, generation of heat from a spindle drive motor, absorption of heat by a coolant supplied from a coolant supplier to the tool, and absorption of heat by a lubrication oil supplied from a lubrication oil supplier to a spindle bearing, for example. As a result, in some cases, relative thermal displacement is caused between the tool and the workpiece.

According to a technique conventionally used in response to this issue, a command value for a numerical controller for control of a machine tool is compensated in consideration of influence by thermal expansion of a spindle caused by various heat sources such as a heat source near the spindle in the machine tool and outside air temperature, thereby increasing machine accuracy (see Patent Document 1, for example).

Patent Document 1: Japanese Unexamined Patent Application, Publication No. H07-75937

SUMMARY OF THE INVENTION

However, Patent Document 1 merely mentions installation of multiple temperature sensors as a method of acquiring a characteristic value about the machine tool. Hence, the technique of Patent Document 1 does not ensure highly accurate compensation.

Further, it takes time for heat measured by the temperature sensor to be transferred and to cause thermal expansion. Hence, it is required to evaluate time delay for highly accurate compensation, leading to a complicated compensation formula.

Additionally, a structure or a member changes depending on the machine on which numerical controllers are to be installed. Hence, an optimum thermal displacement compensation formula is changed in response to a machine type.

Additionally, an external heat source is changed by the environment of use such as an ambient heat generation source or the presence of a gateway, for example. This necessitates change in the appropriate location for a temperature sensor, thereby necessitating change in an optimum compensation formula. Further, increasing the number of measurement instruments for locating the temperature sensor at an appropriate position leads to an increase in production cost and maintenance cost.

In view of the foregoing circumstances, the present invention is intended to provide a machine learning device and a thermal displacement compensation device capable not only of deriving a highly accurate compensation formula but also achieving highly accurate compensation itself at low cost.

(1) A machine learning device according to the present invention is a machine learning device (machine learning device 10, 10A, 10B described later, for example) that optimizes, by machine learning, a calculation formula used for estimating the thermal displacement of a machine element to be thermally expanded in a machine tool (machine tool 35 described later, for example) based on a measured data group containing temperature data about the machine element and its surroundings and/or operating state data about the machine element. The machine learning device comprises: a measured data acquisition unit (measured data acquisition unit 11 described later, for example) that acquires the measured data group; a thermal displacement acquisition unit (thermal displacement acquisition unit 12 described later, for example) that acquires a thermal displacement actual measured value about the machine element; a storage unit (storage unit 13 described later, for example) that uses the measured data group acquired by the measured data acquisition unit as input data, uses the thermal displacement actual measured value about the machine element acquired by the thermal displacement acquisition unit as a label, and stores the input data and the label in association with each other as teaching data; and a calculation formula learning unit (calculation formula learning unit 14 described later, for example) that performs machine learning based on the measured data group and the thermal displacement actual measured value about the machine element, thereby setting a thermal displacement estimation calculation formula used for calculating the thermal displacement of the machine element based on the measured data group. The calculation formula learning unit sets the thermal displacement estimation calculation formula based on a difference between a thermal displacement estimated value about the machine element calculated by substituting the measured data group in a predetermined period stored as the teaching data in the storage unit into the thermal displacement estimation calculation formula and the thermal displacement actual measured value about the machine element in the predetermined period stored as the label in the storage unit.

(2) In the machine learning device described in (1), the measured data acquisition unit (measured data acquisition unit 11 described later, for example) may further acquire a second measured data group by adding measured data to the measured data group and/or by excluding measured data from the measured data group. The measured data acquisition unit may store the second measured data group as input data into the storage unit (storage unit 13 described later, for example). The calculation formula learning unit (calculation formula learning unit 14 described later, for example) may further set a second thermal displacement estimation calculation formula used for calculating the thermal displacement of the machine tool based on the second measured data group.

(3) The machine learning device described in (2) may further comprise a contribution determination unit (contribution determination unit 15 described later, for example) that determines a contribution to estimation of the thermal displacement of measured data in the measured data group. The contribution determination unit may determine the contribution of measured data as a contribution calculation target based on a difference between a first error and a second error. The first error is an error between a first thermal displacement estimated value and a thermal displacement actual measured value. The first thermal displacement estimated value is calculated using a first thermal displacement estimation calculation formula set based on a measured data group containing the measured data as a contribution calculation target. The second error is an error between a second thermal displacement estimated value and a thermal displacement actual measured value. The second thermal displacement estimated value is calculated using the second thermal displacement estimation calculation formula set based on the second measured data group from which the measured data as a contribution calculation target has been excluded.

(4) The machine learning device described in (3) may further comprise an optimized measured data selection unit (optimized measured data selection unit 16 described later, for example) that selects an optimized measured data group containing a combination of measured data pieces belonging to a measured data group currently acquired and achieving an optimum degree of accuracy using a predetermined number of measured data pieces. The optimized measured data selection unit may select a first measured data group by excluding measured data with the smallest contribution as determined by the contribution determination unit from the measured data group currently acquired. The optimized measured data selection unit may select an (i+1)-th measured data group by excluding measured data with the smallest contribution as determined by the contribution determination unit from an i-th (1≤i) measured data group, and make this selection repeatedly, thereby selecting the optimized measured data group containing the predetermined number of measured data pieces.

(5) In the machine learning device described in (1) to (4), the thermal displacement estimation calculation formula may use a first-order lag element in measured data in the measured data group.

(6) In the machine learning device described in (1) to (5), the thermal displacement estimation calculation formula may use a time shift element in measured data in the measured data group.

(7) In the machine learning device described in (1) to (6), the thermal displacement estimation calculation formula may be set based on machine learning using a neural network.

(8) In the machine learning device described in (1) to (6), the calculation formula learning unit (calculation formula learning unit 14 described later, for example) may set the thermal displacement estimation calculation formula based on machine learning using L2 regularization multiple regression analysis.

(9) In the machine learning device described in (1) to (6), the calculation formula learning unit (calculation formula learning unit 14 described later, for example) may set the thermal displacement estimation calculation formula using sparse regularization learning.

(10) The machine learning device described in (9) may further comprise a detection unit (detection unit 17 described later, for example) that detects measured data in the measured data group that do not contribute to an increase in the accuracy of thermal displacement estimation. The detection unit may detect the measured data based on the thermal displacement estimation calculation formula set by sparse regularization learning.

(11) The machine learning device described in (1) to (10) may be incorporated in a controller (controller 30 described later, for example) for the machine tool (machine tool 35 described later, for example).

(12) A thermal displacement compensation device according to the present invention comprises: a compensation value calculation unit (compensation value calculation unit 22 described later, for example), where based on the thermal displacement estimation calculation formula set by the machine learning device described in (1) to (11) (machine learning device 10, 10A, 10B described later, for example), the compensation value calculation unit calculates a compensation value corresponding to the thermal displacement of the machine element calculated from the measured data group; and a compensation unit (compensation unit 24 described later, for example) that compensates the machine position of the machine element based on the compensation value about the machine element calculated by the compensation value calculation unit.

(13) The thermal displacement compensation device described in (12) may be incorporated in the controller (controller 30 described later, for example) for the machine tool (machine tool 35 described later, for example).

According to the present invention, not only highly accurate derivation of a compensation formula but also highly accurate compensation itself can be achieved at low cost.

BRIEF DESCRIPTION OF THE DRAWINGS

FIG. 6A is a flowchart showing an example of a neural network used for the machine learning according to the first embodiment of the present invention;

FIG. 6B is a flowchart showing an example of a neural network used for the machine learning according to the first embodiment of the present invention;

DETAILED DESCRIPTION OF THE INVENTION

First Embodiment

Figure 1:
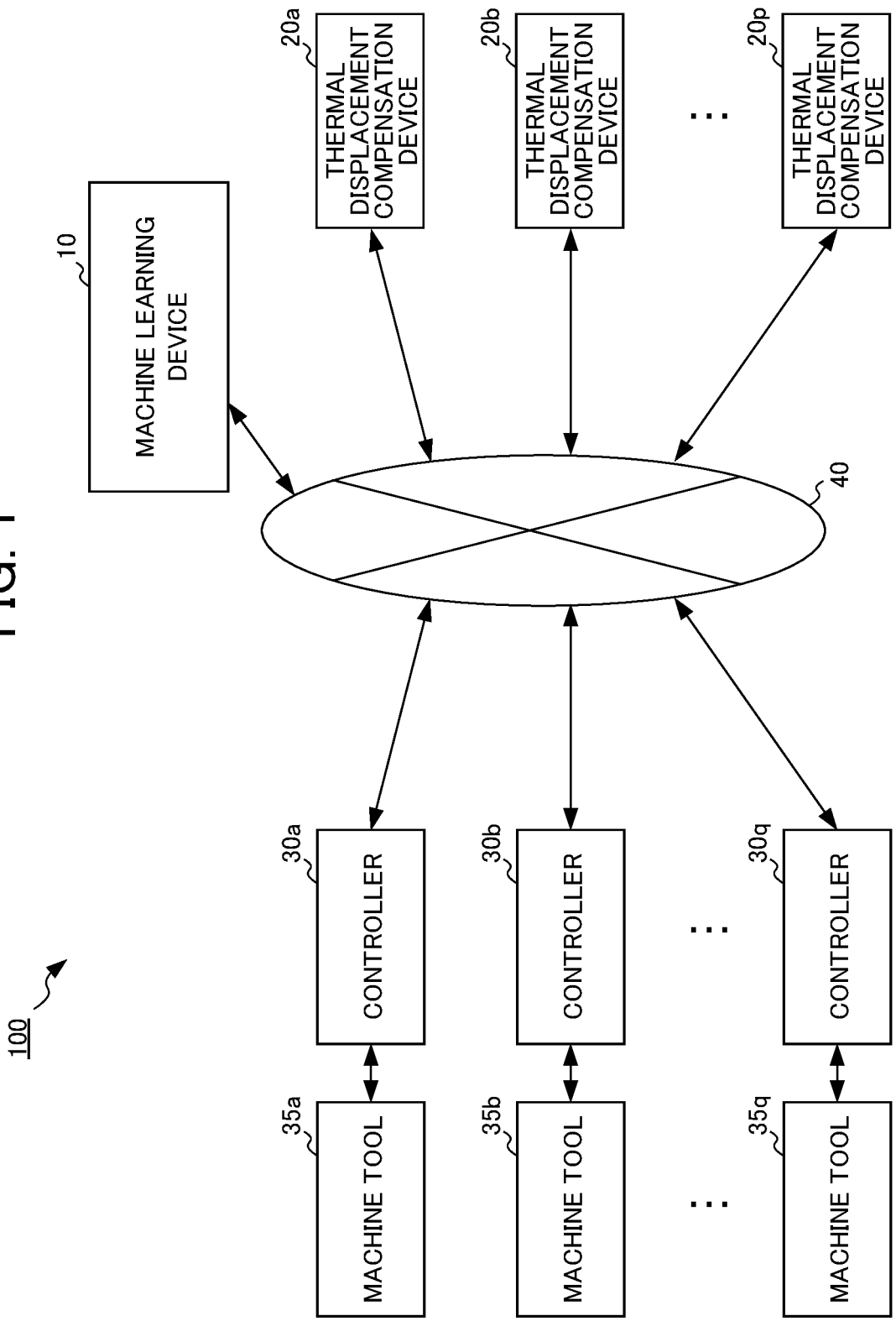
FIG. 1 is a block diagram showing a thermal displacement compensation system according to a first embodiment of the present invention.
Figure 2:
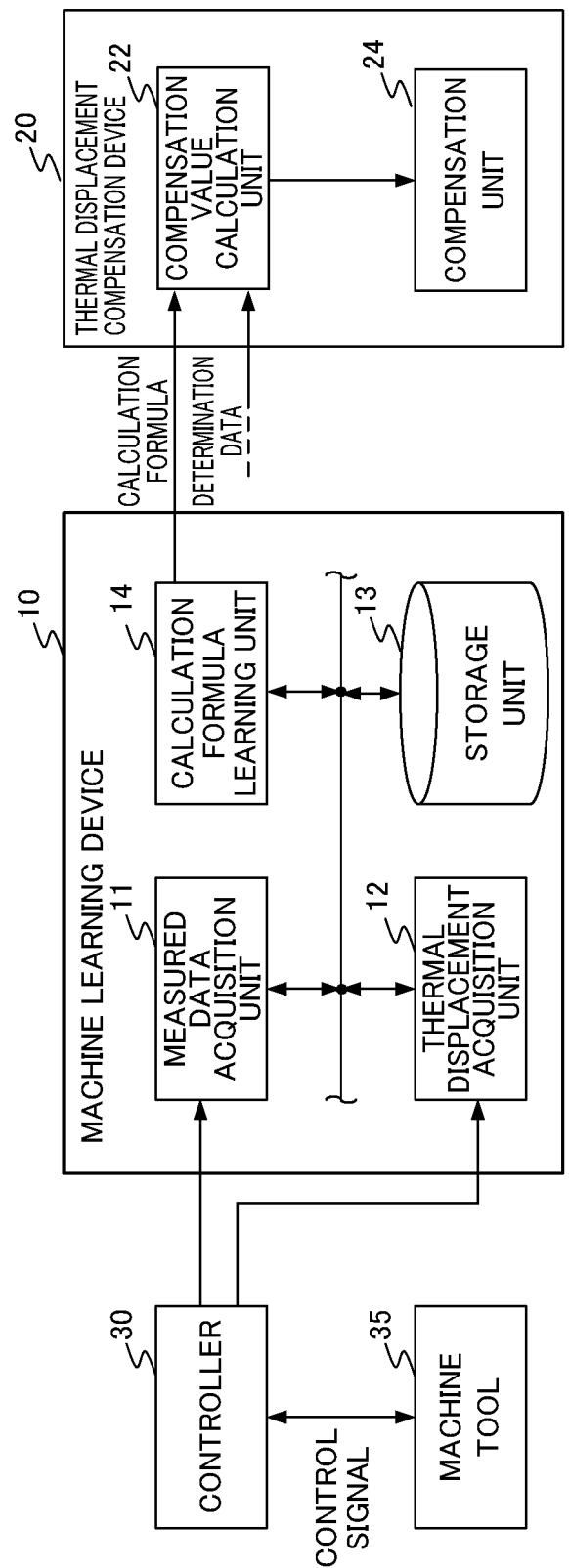
FIG. 2 is a block diagram showing a machine learning device and a thermal displacement compensation device according to the first embodiment of the present invention in detail.
Figure 3:
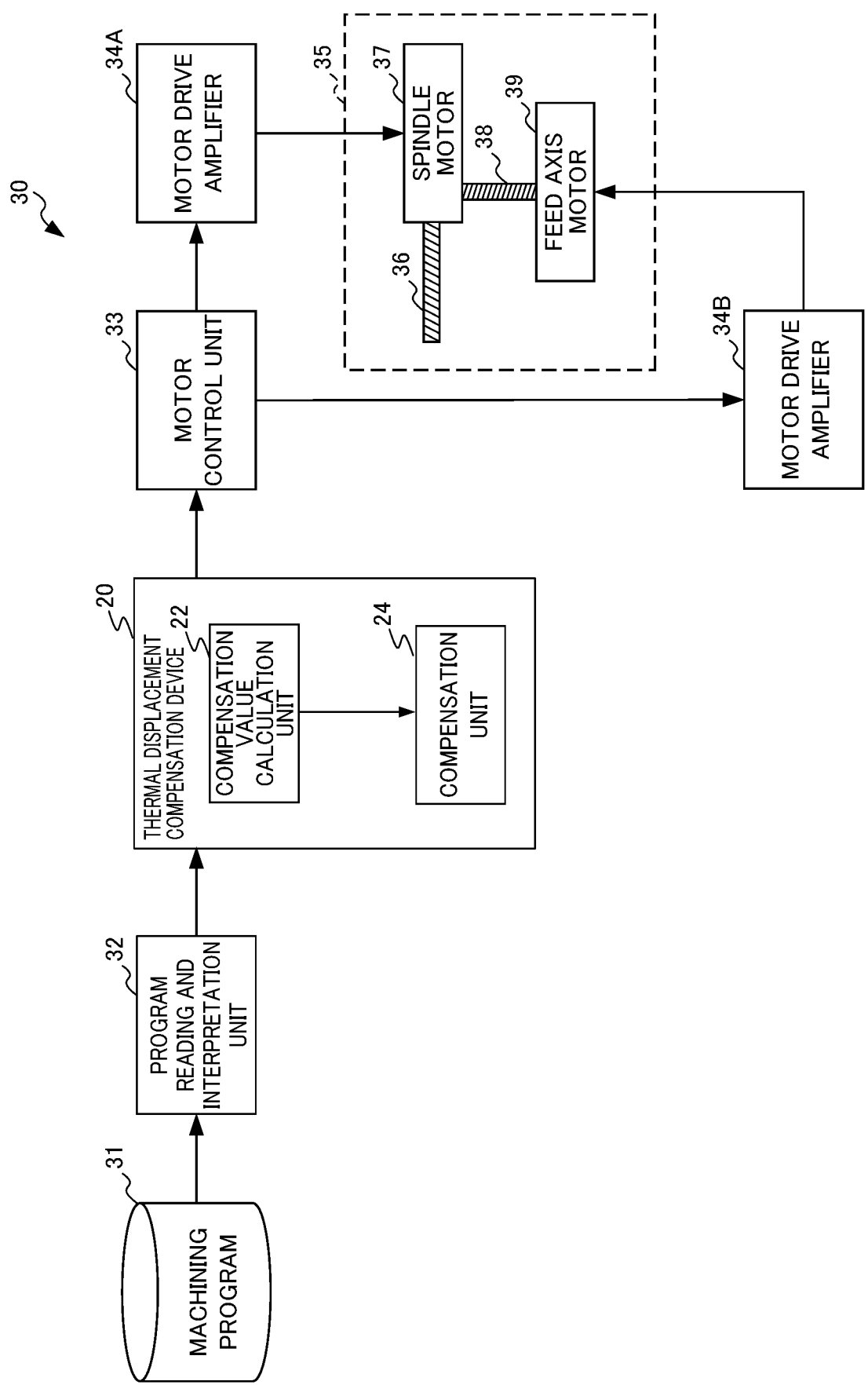
FIG. 3 is a block diagram showing a machine tool and a controller according to the first embodiment of the present invention in detail.

A first embodiment of the present invention will be described below based on the drawings. FIG. 1 is a block diagram showing a thermal displacement compensation system according to this embodiment. FIG. 2 is a block diagram showing a machine learning device and a thermal displacement compensation device according to this embodiment in detail. FIG. 3 is a block diagram showing a machine tool and a controller according to this embodiment in detail.

<Configuration of Thermal Displacement Compensation System 100>

The configuration of a thermal displacement compensation system 100 according to this embodiment is described first. As shown in FIG. 1, the thermal displacement compensation system 100 includes a machine learning device 10, a thermal displacement compensation device 20, a controller 30, a machine tool 35, and a network 40. The number of machine learning devices 10, that of the thermal displacement compensation devices 20, that of the controllers 30, and that of the machine tools 35 may be one, or two or more.

One controller 30 and one machine tool 35 form a pair and are connected in a manner that allows communication therebetween. Multiple pairs each including one controller 30 and one machine tool 35 may be installed in the same factory or different factories, for example.

The machine learning device 10, the thermal displacement compensation device 20, the controller 30, and the machine tool 35 are connected to the network 40 and are allowed to communicate with each other through the network 40. For example, the network 40 is a local area network (LAN) constructed in a factory, the Internet, a public telephone network, or a combination of these networks. There is no particular limitation on the communication through the network 40 in terms of a specific communication system or in terms of whether the communication is established via wires or without wires. The thermal displacement compensation device 20 and the controller 30 may not be configured to communicate with each other using the network 40 but may be configured to be directly connected through a connection unit. The machine learning device 10 and the controller 30 may be directly connected through a connection unit.

The functions of these devices in the thermal displacement compensation system 100 will be described next based on FIG. 2.

FIG. 2 is a block diagram showing a functional block in each device. All the thermal displacement compensation devices 20 have the same function. Thus, only one thermal displacement compensation device 20 is shown in FIG. 2. Likewise, all the controllers 30 have the same function and all the machine tools 35 have the same function. Thus, only one controller 30 and only one machine tool 35 are shown in FIG. 2. The network 40 existing between the devices is omitted from FIG. 2.

As shown in FIG. 3, the machine tool 35 performs machining using a spindle to which a cutter is attached and which is rotated by a spindle motor 37, and a feed axis for feeding the spindle. Specifically, the cutter is rotated by the spindle motor 37 for driving the spindle 36, and is fed by a feed axis motor 39 for driving the feed axis 38. While the machine tool 35 is described as a cutting machine in the embodiments, the machine tool 35 is not limited to the cutting machine.

As shown in FIGS. 2 and 3, the controller 30 feeds a control signal to the machine tool 35, thereby controlling the machine tool 35 so as to make the machine tool 35 perform the predetermined machining. The controller 30 stores multiple machining programs 31 determined in response to the detail of machining on a workpiece. The controller 30 includes: a program reading and interpretation unit 32 that reads and interprets the machining programs 31, thereby extracting conditions for machining (the frequency of acceleration or deceleration of the spindle, a spindle speed, cutting load, and cutting time, for example) and outputting position command data, etc. to the thermal displacement compensation device 20; a motor control unit 33 that generates an operation command for driving the spindle motor 37 and the feed axis motor 39 in the machine tool 35 based on position command data output from the thermal displacement compensation device 20 resulting from thermal displacement compensation; a motor drive amplifier 34A that amplifies the operation command and outputs the amplified operation command to the spindle motor 37 in the machine tool 35; and a motor drive amplifier 34B that amplifies the operation command and outputs the amplified operation command to the feed axis motor 39. The program reading and interpretation unit 32 may extract conditions for machining (the frequency of acceleration or deceleration of the spindle, a spindle speed, cutting load, and cutting time, for example) and output the extracted conditions to the thermal displacement compensation device 20. Regarding the conditions such as a spindle speed and cutting time, the controller 30 may output information about these conditions obtained in real time from the spindle motor 37 and/or the feed axis motor 39 to the thermal displacement compensation device 20. For acquisition of measured data, the controller 30 includes multiple terminals for connections to sensors attached to the machine tool 35. A sensor can be newly connected to the controller 30, a sensor can be removed from the controller 30, or the location of a sensor can be changed by inserting or pulling out a cable of the sensor from the terminals. The arrangement of the sensors installed on the machine tool 35 can also be changed. The location change of a sensor can be such that the sensor is removed from the location in the machine tool 35 and the removed sensor is added to a changed location.

As shown in FIG. 2, the machine learning device 10 learns a thermal displacement estimation calculation formula for the machine tool 35 by machine learning with a teacher. For this learning, the machine learning device 10 includes a measured data acquisition unit 11, a thermal displacement acquisition unit 12, a storage unit 13, and a calculation formula learning unit 14.

The measured data acquisition unit 11 acquires a measured data group from the controller 30. The measured data mentioned herein may contain temperature data about a machine element in the machine tool 35 and its surroundings measured by a temperature sensor. The measured data may also contain operating state data about a machine element in the machine tool 35, more specifically, a physical value such as a spindle speed, the flow rate of a coolant to the spindle, or the amount of a lubrication oil to the spindle bearing in the machine tool 35 measured at a place where a temperature sensor cannot be attached, for example.

The thermal displacement acquisition unit 12 acquires a thermal displacement actual measured value about a machine element in the machine tool 35 measured with a probe, for example.

The storage unit 13 uses the measured data group acquired by the measured data acquisition unit 11 as input data, uses the thermal displacement actual measured value about the machine element acquired by the thermal displacement acquisition unit 12 as a label, and stores the input data and the label in association with each other as teaching data.

The calculation formula learning unit 14 performs machine learning based on the measured data group and the thermal displacement actual measured value about the machine element, thereby setting a thermal displacement estimation calculation formula used for calculating the thermal displacement of the machine element based on the measured data group. More specifically, the calculation formula learning unit 14 sets the thermal displacement estimation calculation formula as follows. Due to the presence of multiple independent variables in the measured data group, the calculation formula learning unit 14 performs multiple regression of a generalized linear model. Based on a difference between a thermal displacement estimated value about the machine element calculated by substituting the measured data group in a predetermined period stored as teaching data in the storage unit 13 into the thermal displacement estimation calculation formula to be obtained and the thermal displacement actual measured value about the machine element in the predetermined period stored as a label in the storage unit 13, the calculation formula learning unit 14 sets the thermal displacement estimation calculation formula so as to minimize this difference by the least-square method, for example. More specifically, on the assumption that measured data (input data) is $X_1, X_2, \ldots, X_n$, a thermal displacement estimated value about each component forming the machine tool 35 such as a spindle, a bed, or a column is $f(X_1, X_2, \ldots, X_n)$ (n is a natural number), and a thermal displacement actual measured value is $Y_L$, the calculation formula learning unit 14 sets the thermal displacement estimation calculation formula that minimizes a difference between $f(X_1, X_2, \ldots, X_n)$ and $Y_L$.

As shown in FIG. 2, the thermal displacement compensation device 20 includes a compensation value calculation unit 22 as a compensation value calculation means and a compensation unit 24 as a compensation execution means. The compensation value calculation unit 22 calculates a compensation value corresponding to the thermal displacement of the machine element calculated from the measured data group (determination data) based on the thermal displacement estimation calculation formula set by the machine learning device 10. The compensation unit 24 compensates the machine position of the machine element based on the compensation value about the machine element calculated by the compensation value calculation unit 22. Alternatively, the compensation unit 24 transmits this compensation value about the machine element to the controller 30. More specifically, as shown in FIG. 3, the compensation unit 24 compensates a condition for machining output from the program reading and interpretation unit 32 of the controller 30 using this compensation value about the machine element, and then outputs position command data to the motor control unit 33.

<Operation of Machine Learning>

Figure 4:
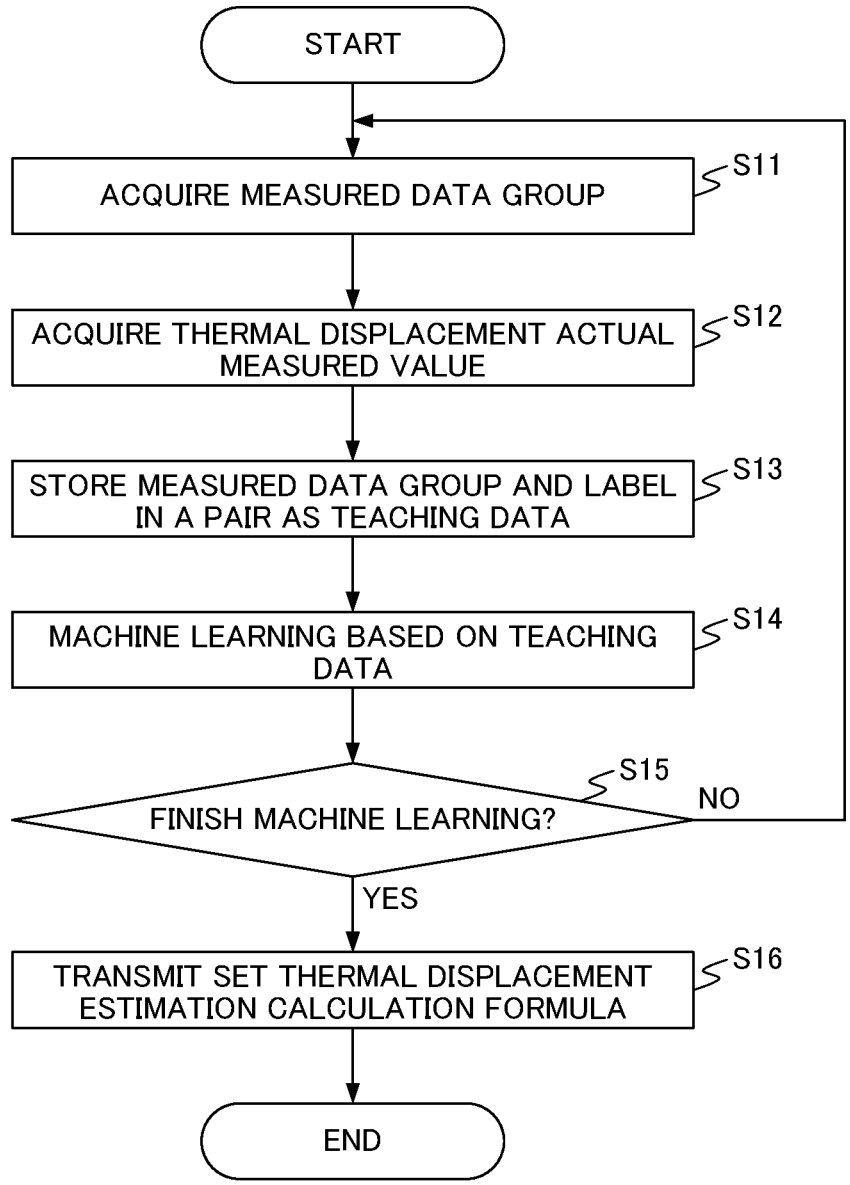
FIG. 4 is a flowchart showing the operation of machine learning by the machine learning device according to the first embodiment of the present invention.

The operation of machine learning in the thermal displacement compensation system 100 according to this embodiment will be described next. FIG. 4 is a flowchart showing the operation of the machine learning by the machine learning device 10.

In step S11, the measured data acquisition unit 11 of the machine learning device 10 acquires a measured data group from the controller 30. More specifically, the measured data acquisition unit 11 acquires temperature data about a machine element in the machine tool 35 and its surroundings and/or operating state data. The operating state data may contain a spindle speed, the flow rate of a coolant, and the flow rate of a lubrication oil, for example. The measured data to be acquired may not be data about a temperature itself but may be data about a temperature change, for example. The data about a temperature change to be acquired may be data about a temperature change from an initial temperature or may be data about a temperature change from a previously measured temperature to a currently measured temperature. The operating state data may also contain the amount of heat absorbed by a coolant or the amount of heat absorbed by a lubrication oil.

In step S12, the thermal displacement acquisition unit 12 of the machine learning device 10 acquires a thermal displacement actual measured value about the machine element in the machine tool 35 measured with a probe, for example. As a specific example, the thermal displacement acquisition unit 12 may measure a component in an X-axis direction, a component in a Y-axis direction, and a component in a Z-axis direction of the thermal displacement, and acquire a group of resultant measured values as the actual measured value.

In step S13, the storage unit 13 of the machine learning device 10 uses the measured data group acquired by the measured data acquisition unit 11 as input data, uses the thermal displacement actual measured value about the machine element acquired by the thermal displacement acquisition unit 12 as a label, and stores the input data and the label in a pair associated with each other as teaching data.

In step S14, the calculation formula learning unit 14 of the machine learning device 10 performs machine learning based on the teaching data. Specific exemplary methods of the machine learning will be described later.

In step S15, the calculation formula learning unit 14 of the machine learning device 10 determines whether to finish the machine learning or to repeat the machine learning. A condition for finishing the machine learning can be determined arbitrarily. If the machining learning is determined to be finished (S15: YES), the flow goes to step S16. If the machining learning is determined to be repeated (S15: NO), the flow returns to step S11 and the same processing is repeated.

In step S16, the machine learning device 10 transmits a thermal displacement estimation calculation formula set by the machine learning having been performed before step S16 to each thermal displacement compensation device 20 through the network 40.

The storage unit 13 of the machine learning device 10 stores the thermal displacement estimation calculation formula. By doing so, if a thermal displacement estimation calculation formula is requested from a newly installed thermal displacement compensation device 20, the stored thermal displacement estimation calculation formula can be transmitted to this new thermal displacement compensation device 20. If new teaching data is acquired, further machine learning can be performed with the new teaching data.

<Exemplary Method of Machine Learning>

As described above, in step S14 of FIG. 4, the calculation formula learning unit 14 performs the machine learning based on the teaching data. Exemplary methods of the machine learning will be described in detail.

As a first method, a coefficient that minimizes a square error between a thermal displacement estimated value and a thermal displacement actual measured value can be inferred and set by machine learning using the least-square method. This thermal displacement estimated value is calculated using a thermal displacement estimation calculation formula $Y = a_1 X_1 + a_2 X_2 + \ldots a_n X_n$ based on multiple regression of a generalized linear model. Here, Y is a thermal displacement estimated value, $X_1, X_2, \ldots, X_n$ are corresponding measured data values, and $a_1, a_2, \ldots, a_n$ are coefficients determined by the multiple regression. More specifically, assuming that measured data is $X_k$ and a label is $Y_L$, a group of coefficients $a_k$ is determined that minimizes a total of values about multiple teaching data pieces obtained from the following formula 1. In this formula, k is a natural number, n is any integer, and k≤n.

[Formula 1]

$$(Y_L - Y) = (Y_L - \Sigma_{k=1}^n a_k X_k)^2 \quad (1)$$

According to the first method, not normal multiple regression analysis but multiple regression analysis giving consideration to an L2 regularization term is feasible. Specifically, a coefficient that minimizes a value obtained by adding the L2 regularization term to a square error between a thermal displacement estimated value calculated using the thermal displacement estimation calculation formula $Y = a_1 X_1 + a_2 X_2 + \ldots a_n X_n$ and a thermal displacement actual measured value can be inferred and set by machine learning. Like in the foregoing case, Y is a thermal displacement estimated value, $X_1, X_2, \ldots, X_n$ are corresponding measured data values, and $a_1, a_2, \ldots, a_n$ are coefficients determined by the multiple regression giving consideration to the L2 regularization term. More specifically, assuming that measured data is $X_k$ and a label is $Y_L$, a group of coefficients $a_k$ is determined that minimizes a total of values about multiple teaching data pieces obtained from the following formula 2. In this formula, n is a natural number and means the number of measurement points of teaching data used for learning. Further, λ is a hyperparameter, which is a parameter that is set in advance before machine learning begins.

[Formula 2]

$$(Y_L - Y)^2 + \Sigma_{k=1}^n (a_k)^2 = (Y_L - \Sigma_{k=1}^n a_k X_k)^2 + \lambda \Sigma_{k=1}^n (a_k)^2 \quad (2)$$

According to the first method, sparse regularization is feasible. For example, multiple regression analysis giving consideration to an L1 regularization term is feasible. More specifically, assuming that measured data is $X_k$ and a label is $Y_L$, a group of coefficients $a_k$ is determined that minimizes a total of values about multiple teaching data pieces obtained from the following formula 3. In this formula, n is a natural number and means the number of measurement points of teaching data used for learning. Further, λ is a hyperparameter, which is a parameter that is set in advance before machine learning begins. Setting λ at a larger value achieves the effect of increasing the number of terms in which $a_k$ is zero.

[Formula 3]

$$(Y_L - Y)^2 + \lambda \Sigma_{k=1}^n |a_k| = (Y_L - \Sigma_{k=1}^n a_k X_k)^2 + \lambda \Sigma_{k=1}^n |a_k| \quad (3)$$

Here, L2 regularization and L1 regularization are used as exemplary regularizations. However, the regularizations are given as examples and not limited to the above.

According to the first method, a first-order lag element in measured data or a time shift element in the measured data is usable as input data for implementation of the aforementioned machine learning. More specifically, assuming that a thermal displacement estimated value at time t is Y(t) and a measured value from a sensor $X_k$ at the time t is $X_k(t)$, a thermal displacement estimation calculation formula using a first-order lag element in measured data is expressed as follows:

[Formula 4]

$$Y(t) = \Sigma_{k=1}^n a_k (\Sigma_{\tau=0}^{T_k} X_k(t - \tau \Delta t_k) e^{-b_k \tau \Delta t_k}) \quad (4)$$

In this way, a coefficient $a_k$, a coefficient $b_k$, and a coefficient $T_k$ are determined by machine learning. In this formula, $\Delta t_k$ is sampling time of a measured value from the sensor $X_k$.

Assuming that a thermal displacement estimated value at the time t is Y(t) and a measured value from the sensor $X_k$ at the time t is $X_k(t)$, a thermal displacement estimation formula using a time shift element in the measured data is expressed as follows:

[Formula 5]

$$Y(t) = \Sigma_{k=1}^n \Sigma_{\tau=0}^{T_k} a_{k\tau} X_k(t - \tau \Delta t_k) \quad (5)$$

In this way, a coefficient $a_k$, and a coefficient $T_k$ are determined by machine learning. In this formula, $\Delta t_k$ is sampling time of a measured value from the sensor $X_k$.

Various regularization terms such as an L1 regularization term and an L2 regularization term may be added to learning while a first-order lag element in measured data or a time shift element in the measured data is used. In this case, regularization terms corresponding to various parameters such as $a_k$, $a_{k\tau}$, $b_k$, and $T_k$ are added.

Figure 5:
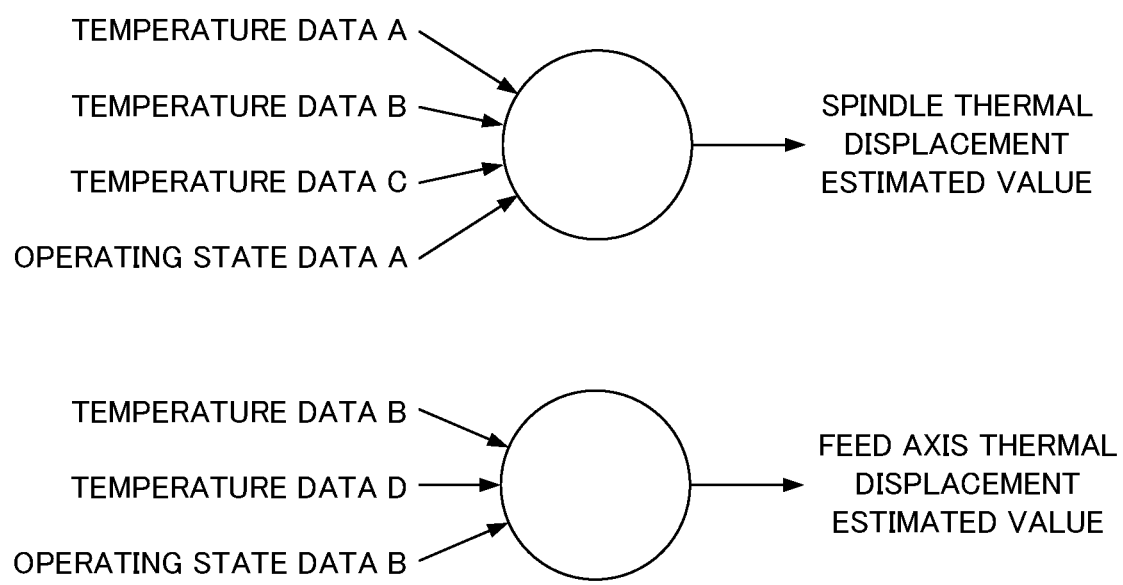
FIG. 5 is a flowchart showing an example of a neural network used for the machine learning according to the first embodiment of the present invention.

As a second method, machine learning using a known neural network is feasible. For example, a single-layer neural network such as that shown in FIG. 5 is usable. Referring to FIG. 5, a spindle thermal displacement estimated value is determined based on temperature data A, temperature data B, temperature data C, and operating state data A. Further, a feed axis thermal displacement estimated value is determined based on temperature data B, temperature data D, and operating state data B. However, this is not the only case but is given as an example.

Multi-layer neural networks such as those shown in FIGS. 6A and 6B are also usable. In particular, a recurrent neural network such as that shown in FIG. 6A is used effectively in which an output from an intermediate layer is simultaneously input to the intermediate layer. Further, a time-delay feed-forward neural network such as that shown in FIG. 6B is also used effectively in which history data pieces covering a predetermined period of time from the past to the present including temperature data $A_t$, temperature data$_{At-1}$, and temperature data$_{At-2}$, for example, are used simultaneously as input values. Data to be input to the neural network may be the foregoing time shift element in measured data (a first-order lag element in the measured data and/or a time shift element in the measured data). For learning using the neural network, various regularization terms such as an L2 regularization term, for example, may be added to the learning. Only one intermediate layer is shown in each of FIGS. 6A and 6B. However, this is not the only number of intermediate layers, and any number of intermediate layers can be set. Referring to FIG. 6A, the temperature data A, the temperature data B, and the operating state data A are input, and a spindle thermal displacement estimated value and a feed axis thermal displacement estimated value are output. However, this is not the only case but is given as an example. Referring to FIG. 6B, the temperature data $A_t$, temperature data$_{At-1}$, and temperature data$_{At-2}$ are input, and a spindle thermal displacement estimated value and a feed axis thermal displacement estimated value are output. However, this is not the only case but is given as an example.

<Operation of Compensation>

Figure 7:
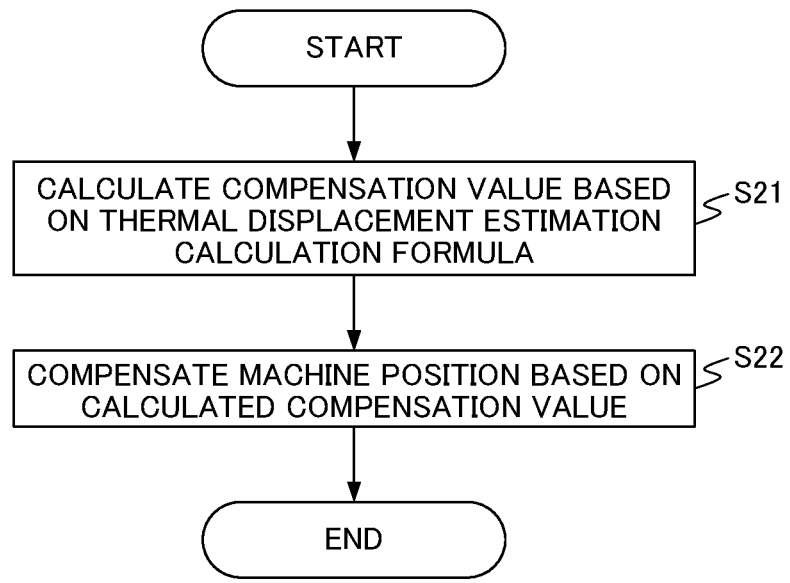
FIG. 7 is a flowchart showing the operation of compensation by the thermal displacement compensation device according to the first embodiment of the present invention.

The operation of compensation in the thermal displacement compensation system 100 according to this embodiment will be described next. FIG. 7 is a flowchart showing the operation of the compensation by the thermal displacement compensation device 20.

In step S21, based on a thermal displacement estimation calculation formula set by the machine learning device 10, the compensation value calculation unit 22 calculates a compensation value corresponding to the thermal displacement of a machine element calculated from a measured data group.

In step S22, the compensation unit 24 compensates the machine position of the machine element based on the compensation value about the machine element calculated by the compensation value calculation unit 22, thereby offsetting the thermal displacement. Unlike the illustration in FIG. 7, the compensation unit 24 may transmit the compensation value about the machine element to the controller 30 in step S22. More specifically, the compensation unit 24 may compensate a coordinate position output from the program reading and interpretation unit 32 of the controller 30 using this compensation value about the machine element, and then output position command data to the motor control unit 33. Alternatively, the compensation unit 24 may compensate the machining programs 31 in advance using this compensation value, and then execute the resultant machining programs 31.

<Effect Achieved by First Embodiment>

As described above, in this embodiment, the machine learning device 10 is capable of optimizing a thermal displacement estimation calculation formula by machine learning used for estimating the thermal displacement of a machine element to be thermally expanded in the machine tool 35 based on a measured data group containing temperature data about the machine element and its surroundings and/or operating state data about the machine element.

Temperature change at each point where measured data is to be acquired is delayed by heat transfer. Then, the temperature change is reflected in thermal displacement. Thus, the machine learning technique allowing for the delay is effective.

A thermal displacement estimation calculation formula and a compensation formula based on the thermal displacement estimation calculation formula can be provided with increased accuracy by means of tuning in response to the operating environment of the machine tool 35 or the type of the machine tool 35.

Second Embodiment

Figure 8:
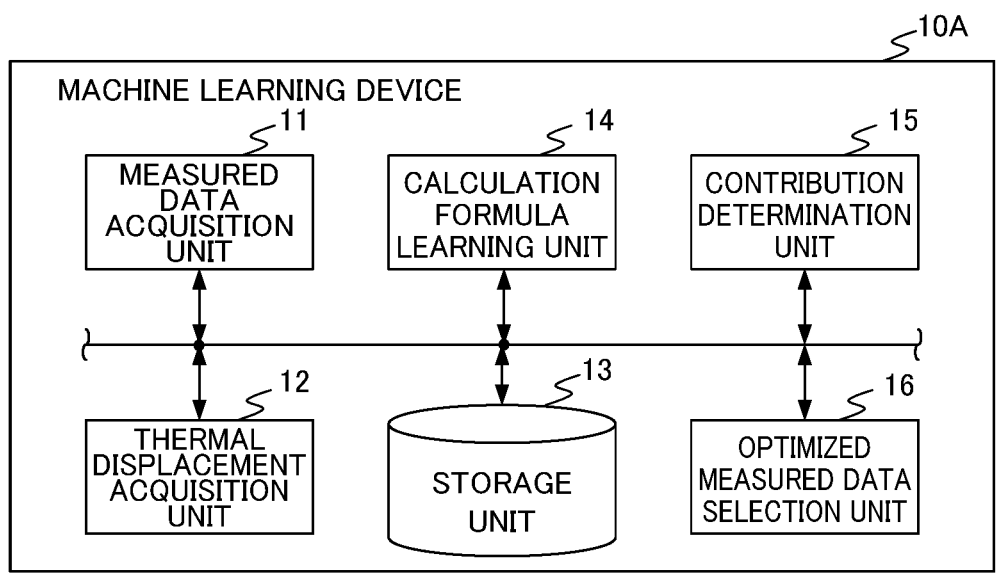
FIG. 8 is a block diagram showing a machine learning device according to a second embodiment of the present invention in detail.
Figure 9:
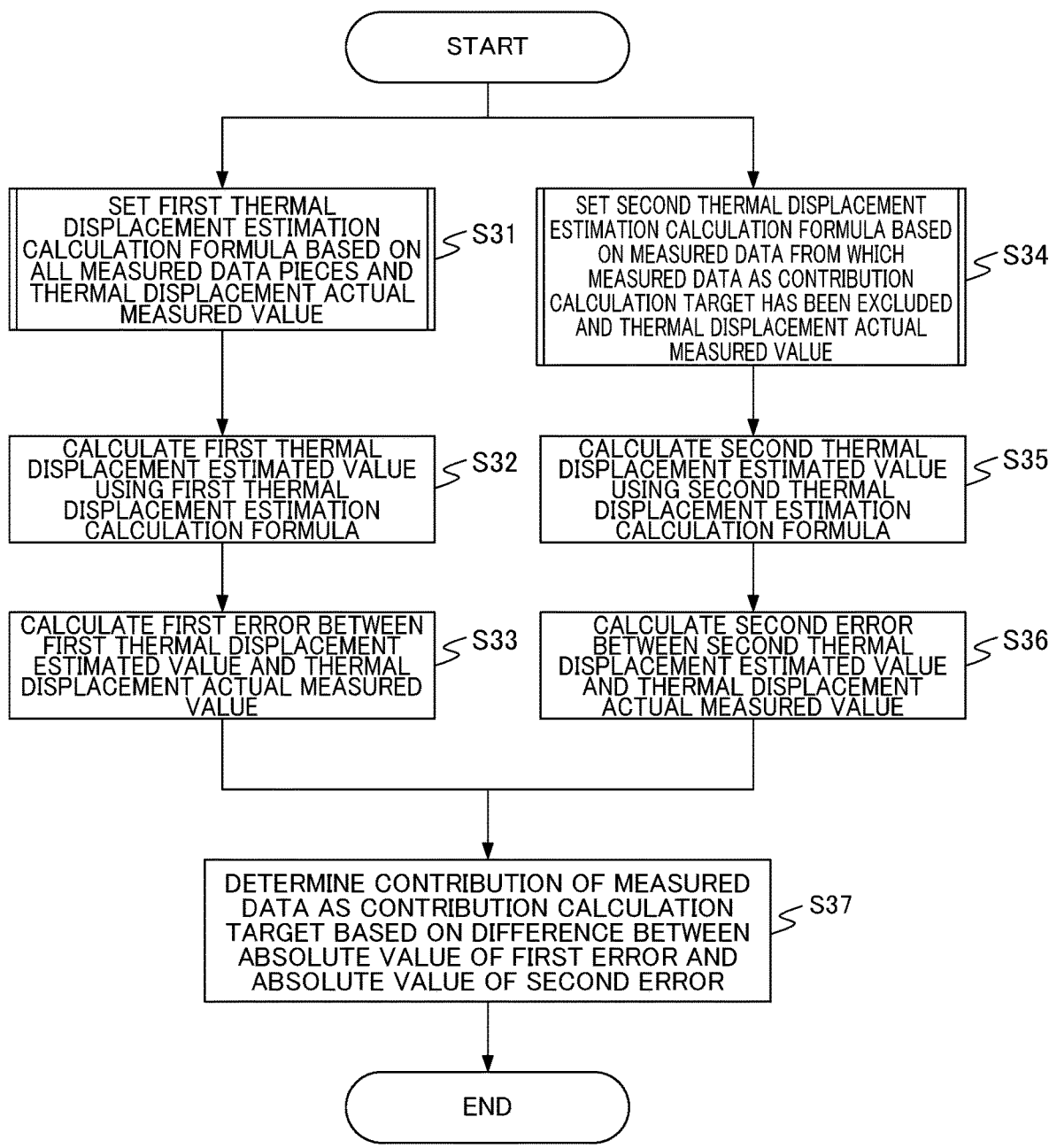
FIG. 9 is a flowchart showing the operation of contribution determination by the machine learning device according to the second embodiment of the present invention.
Figure 10:
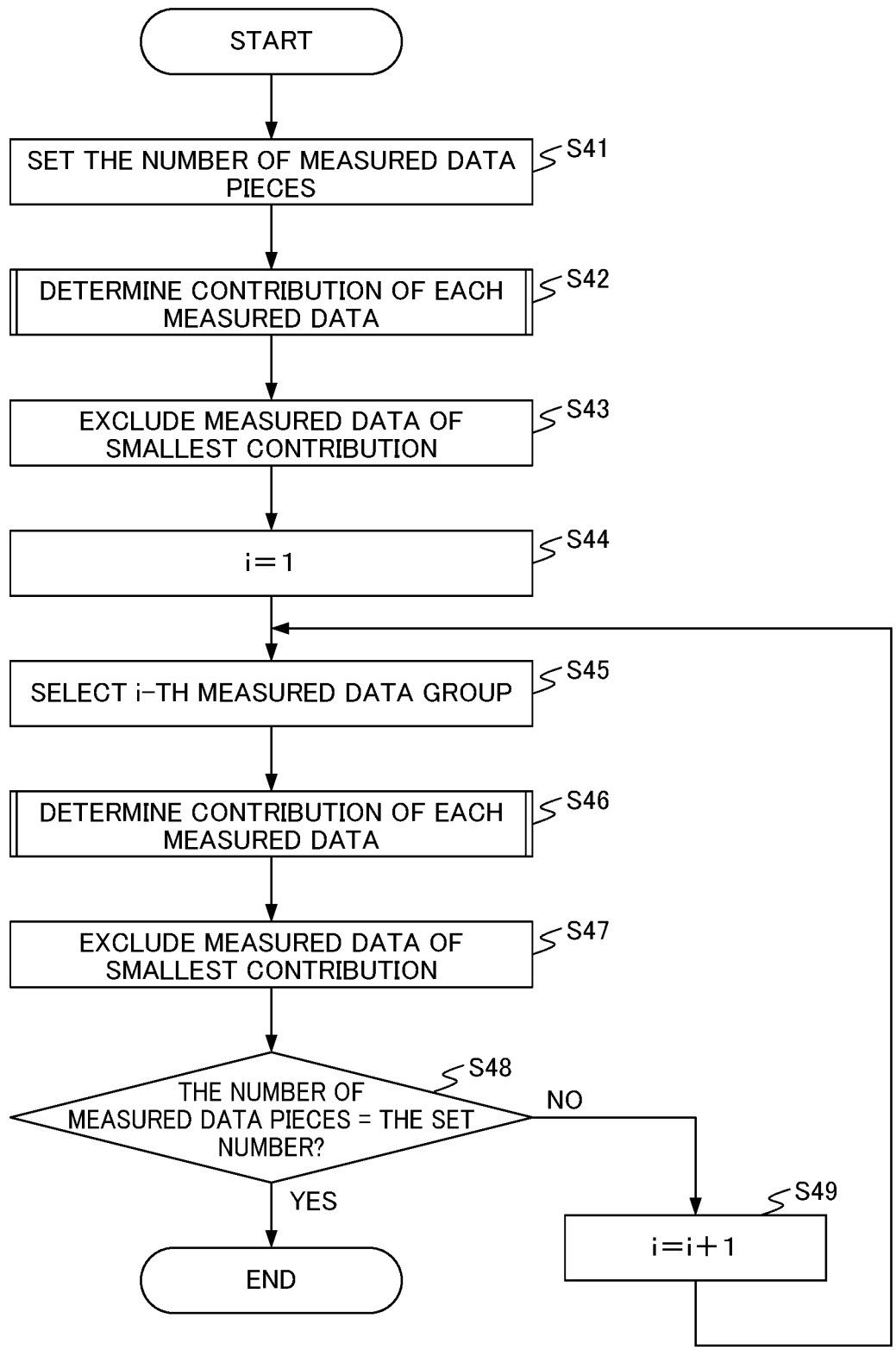
FIG. 10 is a flowchart showing the operation of optimized measured data group selection by the machine learning device according to the second embodiment of the present invention.

A second embodiment of the present invention will be described below based on the drawings. FIG. 8 is a block diagram showing a machine learning device according to this embodiment in detail. FIG. 9 is a flowchart showing the operation of contribution determination by the machine learning device according to this embodiment. FIG. 10 is a flowchart showing the operation of optimized measured data group selection by the machine learning device according to this embodiment.

<Configuration of Thermal Displacement Compensation System 100A>

As shown in FIG. 8, a thermal displacement compensation system 100A according to the second embodiment differs from the thermal displacement compensation system 100 according to the first embodiment in that a machine learning device 10A according to the second embodiment includes a contribution determination unit 15 and an optimized measured data selection unit 16 in addition to the components of the machine learning device 10 according to the first embodiment. The other structures of the second embodiment are basically the same as the aforementioned structures of the first embodiment. Thus, common members are identified by the same signs and will not be described below.

The contribution determination unit 15 determines a contribution to estimation of the thermal displacement of each measured data in a measured data group. More specifically, the contribution determination unit 15 determines the contribution of measured data as a contribution calculation target based on a difference between a first error (absolute value) and a second error (absolute value). The first error is an error between a first thermal displacement estimated value and a thermal displacement actual measured value. The first thermal displacement estimated value is calculated using a first thermal displacement estimation calculation formula set by machine learning based on a first measured data group containing the measured data as a contribution calculation target. The second error is an error between a second thermal displacement estimated value and a thermal displacement actual measured value. The second thermal displacement estimated value is calculated using a second thermal displacement estimation calculation formula set by machine learning based on a second measured data group from which the measured data as a contribution calculation target has been excluded. More specifically, the contribution of the measured data as a contribution calculation target can be determined to be larger with a larger difference between the first error and the second error. A difference between the first error and the second error is preferably determined based on a group of the first errors and a group of the second errors corresponding to multiple groups of teaching data. In this case, an average or a maximum of differences between the first errors and the second errors is usable, for example.

The optimized measured data selection unit 16 selects an optimized measured data group containing a combination of a predetermined number of measured data pieces belonging to a measured data group currently acquired and from which measured data of a small contribution has been excluded, for example. "The number of measured data pieces" mentioned herein means the number of types of measured data pieces differing between sensors used for obtaining the measured data pieces, for example. More specifically, the optimized measured data selection unit 16 selects a first measured data group by excluding measured data with the smallest contribution as determined by the contribution determination unit 15 from the measured data group currently acquired. Next, the optimized measured data selection unit 16 selects an (i+1)-th measured data group by excluding measured data with the smallest contribution as determined by the contribution determination unit 15 from an i-th (1≤i) measured data group. The optimized measured data selection unit 16 makes this selection repeatedly to select the optimized measured data group containing the predetermined number of measured data pieces. Here, i is a natural number.

<Operation of Contribution Determination>

The operation of determining the contribution of measured data in a measured data group by the machine learning device 10A will be described next. FIG. 9 is a flowchart showing the operation of the contribution determination by the machine learning device 10A.

In step S31, the calculation formula learning unit 14 sets the first thermal displacement estimation calculation formula based on the first measured data group containing all measured data pieces and a thermal displacement actual measured value by following the flow illustrated in FIG. 4.

In step S32, the contribution determination unit 15 calculates a first thermal displacement estimated value using the first thermal displacement estimation calculation formula.

In step S33, the contribution determination unit 15 calculates the first error (absolute value) showing an error between the first thermal displacement estimated value and the thermal displacement actual measured value.

In step S34, the calculation formula learning unit 14 sets the second thermal displacement estimation calculation formula based on the second measured data group from which measured data as a contribution calculation target has been excluded and a thermal displacement actual measured value by following the flow illustrated in FIG. 4.

In step S35, the contribution determination unit 15 calculates the second thermal displacement estimated value using the second thermal displacement estimation calculation formula.

In step S36, the contribution determination unit 15 calculates the second error (absolute value) showing an error between the second thermal displacement estimated value and the thermal displacement actual measured value.

Steps S31 to S36 may be executed in parallel as shown in FIG. 9, or may be executed continuously.

In step S37, the contribution determination unit 15 determines the contribution of the measured data as a contribution calculation target based on a difference between the first error and the second error. More specifically, the contribution of the measured data as a contribution calculation target can be determined to be larger with a larger difference between the first error and the second error.

<Operation of Optimized Measured Data Group Selection>

Described next is the operation by the machine learning device 10A for selecting an optimized measured data group containing a predetermined number of measured data pieces by excluding measured data of a small contribution. FIG. 10 is a flowchart showing the operation of the optimized measured data group selection by the machine learning device 10A.

In step S41, the optimized measured data selection unit 16 sets the number of measured data pieces to be ultimately used.

The number of measured data pieces to be ultimately used is set to be smaller than the original number of measured data pieces.

In step S42, the contribution determination unit 15 determines the contribution of each measured data forming a measured data group currently acquired by following the flow illustrated in FIG. 9.

In step S43, the optimized measured data selection unit 16 excludes measured data with the smallest contribution from the measured data group currently acquired, and then determines the resultant measured data group to be the "first measured data group."

In step S44, the optimized measured data selection unit 16 sets an initial value 1 for i.

In step S45, the optimized measured data selection unit 16 selects an i-th measured data group.

In step S46, the contribution determination unit 15 determines the contribution of each measured data forming the i-th measured data group by following the flow illustrated in FIG. 9.

In step S47, the optimized measured data selection unit 16 excludes measured data with the smallest contribution from the i-th measured data group, and then determines the resultant measured data group to be the "(i+1)-th measured data group."

In step S48, the optimized measured data selection unit 16 determines whether the number of measured data pieces in the "(i+1)-th measured data group" is equal to the number of measured data pieces set in step S41. If this number of measured data pieces is equal to the originally set number (S48: YES), the flow is finished. Specifically, the "(i+1)-th measured data group" at the finish of the process in step S48 becomes functional as an optimized measured data group. If the determined number of measured data pieces is not equal to the originally set number (S48: NO), the flow goes to step S49.

In step S49, the optimized measured data selection unit 16 increments i by one. Then, the flow returns to step S45.

<Effect Achieved by Second Embodiment>

As described above, in addition to the effect achieved by the first embodiment, the second embodiment achieves streamlining of a measured data group by excluding measured data of a small contribution from the measured data group.

As described above, the sensors connected to the terminals of the controller 30 are removable. Thus, a sensor that contributes little to accuracy increase may be removed or the position of this sensor may be changed. By doing so, compensation can be made with a high degree of accuracy using sensors of a reduced number. The reduction in the number of sensors leads to cost reduction or ease of maintenance. In particular, highly accurate compensation can be realized with sensors of a reduced number by providing a large number of sensors and acquiring measured data in advance, then calculating contributions by making automatic analysis by machine learning, and removing a sensor of a small contribution.

Third Embodiment

Figure 11:
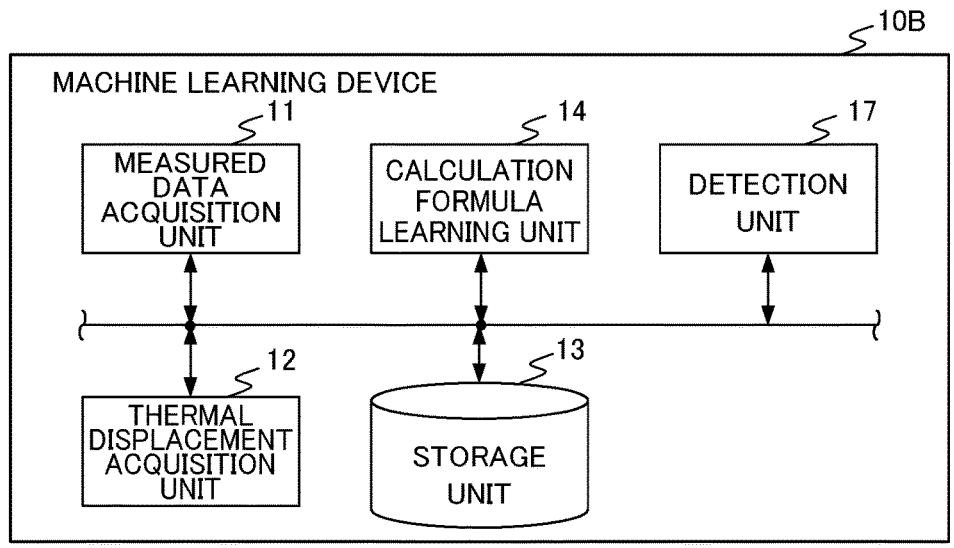
FIG. 11 is a block diagram showing a machine learning device according to a third embodiment of the present invention in detail.
Figure 12:
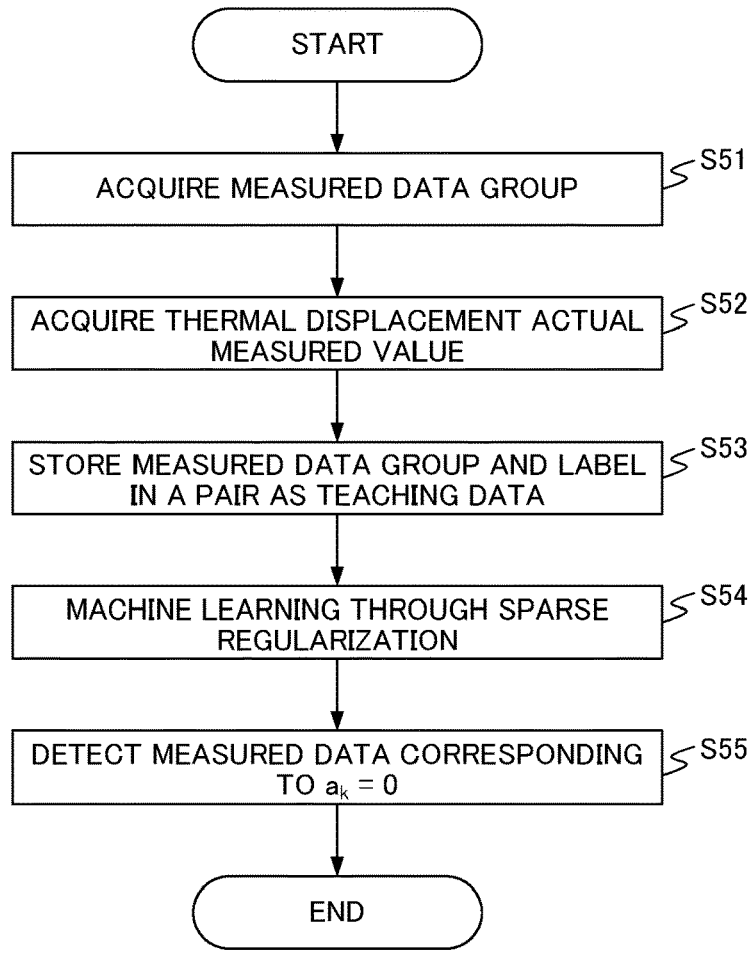
FIG. 12 is a flowchart showing the operation of detection of measured data that do not contribute to an increase in accuracy by the machine learning device according to the third embodiment of the present invention.

A third embodiment of the present invention will be described below based on the drawings. FIG. 11 is a block diagram showing a machine learning device according to this embodiment in detail. FIG. 12 is a flowchart showing the operation of detection of measured data that do not contribute to accuracy increase by the machine learning device according to this embodiment.

<Configuration of Thermal Displacement Compensation System 100B>

As shown in FIG. 11, a thermal displacement compensation system 100B according to the third embodiment differs from the thermal displacement compensation system 100 according to the first embodiment in that a machine learning device 10B includes a detection unit 17 in addition to the components of the machine learning device 10. The other structures of the third embodiment are basically the same as the aforementioned structures of the first embodiment. Thus, common members are identified by the same signs and will not be described below. The third embodiment is to detect measured data that do not contribute to accuracy increase by using sparse regularization learning.

The detection unit 17 detects measured data that do not contribute to increase in the accuracy of thermal displacement estimation based on a thermal displacement estimation formula set by the sparse regularization learning.

<Operation of Detection>

The operation of determining the contribution of measured data in a measured data group by the machine learning device 10B will be described next. FIG. 12 is a flowchart showing the operation of the contribution determination by the machine learning device 10B.

In step S51, the measured data acquisition unit 11 of the machine learning device 10B acquires a measured data group from the controller 30. More specifically, the measured data acquisition unit 11 acquires temperature data about a machine element in the machine tool 35 and its surroundings and/or operating state data about the machine tool 35.

In step S52, the thermal displacement acquisition unit 12 of the machine learning device 10B acquires a thermal displacement actual measured value about the machine element in the machine tool 35 measured with an eddy-current sensor, for example. As a specific example, the thermal displacement acquisition unit 12 may measure a component in an X-axis direction, a component in a Y-axis direction, and a component in a Z-axis direction of the thermal displacement, and acquire a group of resultant measured values as the actual measured value.

In step S53, the storage unit 13 of the machine learning device 10B uses the measured data group acquired by the measured data acquisition unit 11 as input data, uses the thermal displacement actual measured value about the machine element acquired by the thermal displacement acquisition unit 12 as a label, and stores the input data and the label in a pair associated with each other as teaching data.

In step S54, the calculation formula learning unit 14 of the machine learning device 10B performs machine learning through sparse regularization using the teaching data.

In step S55, the detection unit 17 detects measured data $X_k$ to make a coefficient $a_k$ zero. By doing so, the detection unit 17 detects the measured data that do not contribute to increase in the accuracy of thermal displacement estimation based on a thermal displacement estimation formula set by the sparse regularization learning.

The machine learning device 10A according to the second embodiment can optimize a measured data group by using the detection unit 17 in combination with the optimized measured data selection unit 16 instead of the contribution determination unit 15. More specifically, the detection unit 17 detects measured data that do not contribute to increase in the accuracy of thermal displacement estimation such as measured data to make the coefficient $a_k$ zero. The optimized measured data selection unit 16 excludes the measured data that do not contribute to increase in the accuracy of thermal displacement estimation from a measured data group currently acquired. By doing so, a streamlined measured data group can be selected.

<Effect Achieved by Third Embodiment>

As described above, the third embodiment achieves an effect comparable to that achieved by the second embodiment.

Other Embodiments

While the foregoing embodiments are preferred embodiments of the present invention, these embodiments do not limit the scope of the present invention. The present invention is feasible as embodiments to which various changes are added within a range not deviating from the substance of the present invention.

[First Modification]

In the embodiments, a thermal displacement estimation calculation formula is described as a polynomial formulated based on multiple regression of a generalized linear model. However, this is not the only case but the thermal displacement estimation calculation formula may be formulated based on multiple regression of a non-linear model.

[Second Modification]

The techniques in the foregoing embodiments are to optimize a measured data group by deleting measured data. However, this is not the only case but the measured data group may be optimized by adding measured data. More specifically, if the degree of accuracy of a thermal displacement estimation calculation formula set as a result of machine learning is less than a threshold, measured data may be added. Further, after certain measured data is deleted, different measured data may be added. In particular, if a sensor is added by a maintenance operator or an end user of a machine tool, the accuracy of thermal displacement compensation is increased by means of automatic tuning of a compensation formula based on a thermal displacement estimation calculation formula. In order to increase the accuracy of thermal displacement compensation, for example, machine learning may be performed using a measured data group obtained by changing the position of a temperature sensor, for example. In this case, a determination can also be made as to whether accuracy is increased by evaluating a difference between an error between a thermal displacement estimated value calculated using a thermal displacement estimation formula obtained after the position change and a thermal displacement actual measured value, and an error between a thermal displacement estimated value calculated using a thermal displacement compensation formula obtained based on machine learning using a measured data group before the position change and a thermal displacement actual measured value.

[Third Modification]

In the foregoing embodiments, the machine tool 35 is described as a cutting machine. However, the machine tool 35 is not limited to the cutting machine. The machine tool 35 may also be a wire discharge machine or a laser machine, for example.

[Fourth Modification]

The controller 30 may be configured to include the thermal displacement compensation device 20. The controller 30 may alternatively be configured to include the machine learning device 10, 10A, or 10B.

[Fifth Modification]

Each of the machine learning devices 10, 10A, and 10B in the foregoing embodiments may be configured as a computer system including a CPU. In this case, the CPU reads a program from a storage unit such as a ROM, for example, and follows the read program, thereby causing the computer to function as the measured data acquisition unit 11, the thermal displacement acquisition unit 12, the storage unit 13, the calculation formula learning unit 14, the contribution determination unit 15, the optimized measured data selection unit 16, and the detection unit 17.

EXPLANATION OF REFERENCE NUMERALS

- 10 10A 10B Machine learning device
- 11 Measured data acquisition unit
- 12 Thermal displacement acquisition unit
- 13 Storage unit
- 14 Calculation formula learning unit
- 15 Contribution determination unit
- 16 Optimized measured data selection unit
- 17 Detection unit
- 20 Thermal displacement compensation device
- 22 Compensation value calculation unit
- 24 Compensation unit
- 30 Controller
- 35 Machine tool
- 40 Network
- 100 100A 100B Thermal displacement compensation system

What is claimed is:

1. A machine learning device that optimizes, by machine learning, a calculation formula used for estimating the thermal displacement of a machine element to be thermally expanded in a machine tool based on a measured data group containing temperature data about the machine element and its surroundings and/or operating state data about the machine element, the machine learning device comprising:
   a measured data acquisition unit that acquires the measured data group;
   a thermal displacement acquisition unit that acquires a thermal displacement actual measured value about the machine element;
   a storage unit that uses the measured data group acquired by the measured data acquisition unit as input data, uses the thermal displacement actual measured value about the machine element acquired by the thermal displacement acquisition unit as a label, and stores the input data and the label in association with each other as teaching data;
   a calculation formula learning unit that performs machine learning based on the measured data group and the thermal displacement actual measured value about the machine element, thereby setting a thermal displacement estimation calculation formula used for calculating the thermal displacement of the machine element based on the measured data group; and
   a contribution determination unit that determines a contribution to estimation of the thermal displacement of measured data in the measured data group, wherein
   the calculation formula learning unit sets the thermal displacement estimation calculation formula based on a difference between a thermal displacement estimated value about the machine element calculated by substituting the measured data group in a predetermined period stored as the teaching data in the storage unit into the thermal displacement estimation calculation formula and the thermal displacement actual measured value about the machine element in the predetermined period stored as the label in the storage unit, and
   the contribution determination unit determines the contribution of measured data as a contribution calculation target based on a difference between a first error and a second error, the first error being an error between a first thermal displacement estimated value and a thermal displacement actual measured value, the first thermal displacement estimated value being calculated using a first thermal displacement estimation calculation formula set based on a measured data group containing the measured data as a contribution calculation target, the second error being an error between a second thermal displacement estimated value and a thermal displacement actual measured value, the second thermal displacement estimated value being calculated using a second thermal displacement estimation calculation formula set based on a second measured data group from which the measured data as a contribution calculation target has been excluded.

2. The machine learning device according to claim 1, further comprising an optimized measured data selection unit that selects an optimized measured data group containing a combination of measured data pieces belonging to a measured data group currently acquired and achieving an optimum degree of accuracy using a predetermined number of measured data pieces, wherein
   the optimized measured data selection unit selects a first measured data group by excluding measured data with a smallest contribution as determined by the contribution determination unit from the measured data group currently acquired, and
   the optimized measured data selection unit selects an (i+1)-th measured data group by excluding measured data with a smallest contribution as determined by the contribution determination unit from an i-th ($1 \le i$) measured data group, and makes this selection repeatedly, thereby selecting the optimized measured data group containing the predetermined number of measured data pieces.

3. The machine learning device according to claim 1, wherein the thermal displacement estimation calculation formula uses a first-order lag element in measured data in the measured data group.

4. The machine learning device according to claim 1, wherein the thermal displacement estimation calculation formula uses a time shift element in measured data in the measured data group.

5. The machine learning device according to claim 1, wherein the thermal displacement estimation calculation formula is set based on machine learning using a neural network.

6. The machine learning device according to claim 1, wherein the calculation formula learning unit sets the thermal displacement estimation calculation formula based on machine learning using multiple regression analysis giving consideration to an L2 regularization term.

7. The machine learning device according to claim 1, wherein the calculation formula learning unit sets the thermal displacement estimation calculation formula using sparse regularization learning.

8. The machine learning device according to claim 7, further comprising a detection unit that detects measured data in the measured data group that do not contribute to increase in the accuracy of thermal displacement estimation, wherein
   the detection unit detects the measured data based on the thermal displacement estimation calculation formula set by the sparse regularization learning.

9. The machine learning device according to claim 1, wherein the machine learning device is incorporated in a controller for the machine tool.

10. A thermal displacement compensation device for a machine tool, comprising: a compensation value calculation unit, wherein, based on the thermal displacement estimation calculation formula set by the machine learning device according to claim 1, the compensation value calculation unit calculates a compensation value corresponding to the thermal displacement of the machine element calculated from the measured data group; and a compensation unit that compensates the machine position of the machine element based on the compensation value about the machine element calculated by the compensation value calculation unit.

11. The thermal displacement compensation device according to claim 10, wherein the thermal displacement compensation device is incorporated in a controller for the machine tool.

\* \* \* \* \*